235-382 SR
7/22/86 OR 4,602,150

United States Patent [19]
Nishikawa et al.

[11] Patent Number: 4,602,150
[45] Date of Patent: Jul. 22, 1986

[54] LOCKING AND UNLOCKING DEVICE

[75] Inventors: Makoto Nishikawa; Minoru Tanaka, both of Hiroshima, Japan

[73] Assignee: Kumahira Safe Co. Inc, Hiroshima, Japan

[21] Appl. No.: 580,185

[22] Filed: Feb. 15, 1984

[30] Foreign Application Priority Data

| | | | |
|---|---|---|---|
| Feb. 16, 1983 | [JP] | Japan | 58-24150 |
| Apr. 1, 1983 | [JP] | Japan | 58-48425[U] |
| Dec. 14, 1983 | [JP] | Japan | 58-235858 |

[51] Int. Cl.[4] .......... G06K 5/00
[52] U.S. Cl. .......... 235/382; 235/449; 70/455
[58] Field of Search .......... 235/382, 382.5, 449, 235/493; 70/455

[56] References Cited

U.S. PATENT DOCUMENTS

| | | | |
|---|---|---|---|
| 3,619,570 | 11/1971 | Grosbard | 235/493 X |
| 3,744,027 | 7/1973 | Uemura et al. | 235/382 |
| 3,862,399 | 1/1975 | Cain | 235/493 X |
| 4,396,914 | 8/1983 | Aston | 235/382 X |

*Primary Examiner*—David L. Trafton
*Attorney, Agent, or Firm*—Cushman, Darby & Cushman

[57] ABSTRACT

A locking and unlocking device particularly employable for a double lock system such as a bank lock and a client lock is disclosed. To operate the bank lock, a magnetic card specifically allocated to a client is inserted into a casing or cover through a card insert hole until a plurality of magnetized points on the magnetic card are located in alignment with the corresponding permanent magnet pins, which are held in engagement holes on a sliding member or lever. Polarities and coordinate positions of the magnetized points on the magnetic card are previously determined by means of an encoder. The permanent magnet pins are brought in disengagement from the engagement holes under the influence of magnetic repulsive or attractive force developed between the permanent magnet pins and the magnetized points on the magnetic card when the latter is inserted through the card insert hole. After the sliding member or lever is free from the permanent magnet pins, it is displaced in such a direction that a window formed on the bottom of the casing or the base member becomes exposed to the outside and thereafter the client inserts his key through the window to open the client lock. The cover is slidably fitted to the base member, and after the magnetic card is inserted, it is displaced in the opposite direction to that of insertion of the magnetic card. Safe room entering and leaving readers are preferably fitted to an automatic door for the rental safe room.

17 Claims, 17 Drawing Figures

LOCKING AND UNLOCKING DEVICE

BACKGROUND OF THE INVENTION

1. Field of the Invention

The present invention relates to a locking and unlocking device, and more particularly to a locking and unlocking device particularly employable for a double lock system comprising a bank lock and a client lock in a rental safe room in the bank.

2. Description of the Prior Art

As is well known, most big banks have a rental safe room in a basement or the like place in which a number of rental safe masses are arranged along a wall surface. Each of the rental safe masses are specifically allocated to a certain client in accordance with a contract made between the bank and the client. Each are usually equipped with a double lock system-a client lock and a bank lock-on the front surface thereof, said client lock being opened and closed by operating his own key and said bank lock being opened and closed by operating a key which is carried and controlled by personnel of the bank.

When a client wants to access his rental safe mass in the rental safe room, he tells the bank personnel that he wants to do so. Both the client and the bank personnel then walk to the rental safe room. The bank personnel first opens an entering and leaving door by operating an identification card or key which is carried and controlled by him so that they enter the rental safe room. They walk further to a rental safe mass allocated to the client and the bank personnel opens the bank lock with his key. Now, the client is ready to open his rental safe mass by operating his own key. As will be readily understood from the above description, bank personnel is required to cooperate with a client every time when the latter enters the rental safe room. Therefore, much labor for rental safe services must be extended from the bank causing rental fees to be increased.

To reduce labor works as described above, a central control system has been already proposed which includes a computer installed at the client reception department in a bank so as to carry out opening and closing of the safe room door as well as the bank lock without necessity for bank personnel's help under remote control of the computer. This proposal is easily applicable when a rental safe room is newly built. However, things are different with the case where a rental safe room has been already installed in a bank, because there is necessity for carrying out wiring works between the client reception department and each of rental safe masses. This requires a large amount of labor, time and expenditure. In some case wiring works cannot be carried out or can be carried out only with much difficulties for such an existent rental safe room. Further, another problem with respect to the conventional rental safe room is that it is substantially impossible to identify a client when he enters or leaves the rental safe room merely with the aid of the remote control system as described above including a computer, said identification being intended to prevent an occurrence of criminal activity. If an arrangement is additionally made so that client identification is incorporated into the conventional remote control system, a larger amount of expenditure will be required.

To obviate the foregoing problem there has been already proposed to utilize an identification card for opening and closing a safe room entering and leaving door as well as a bank key. A problem is that a power supply is required for the utilization of an identification card.

SUMMARY OF THE INVENTION

Thus, the present invention has been made with the foregoing problems in mind and its object resides in providing a locking and unlocking device particularly employable for rental safe services which requires no power supply for operating a magnetic card as well as a client's key.

Other object of the present invention is to provide a locking and unlocking device of the above-mentioned type which assures that a client is identified without fail by means of a single magnetic card which serves also as an identification card.

Another object of the present invention is to provide a locking and unlocking device of the above-mentioned type which can be used for opening and closing both the safe room door and the bank lock.

Further another object of the present invention is to provide a locking and unlocking device of the above-mentioned type which is simple in structure and can be manufactured at an inexpensive cost.

To accomplish the above objects there is proposed according to one aspect of the present invention a locking and unlocking device particularly employable for a double lock system comprising a bank lock and a client lock in the rental safe room in a bank, wherein the locking and unlocking device includes a casing with a window and a card insert hole formed thereon, a base plate fixedly secured to said casing, a plurality of permanent magnet pins slidably fitted through said base plate at a right angle relative to the latter, a sliding member adapted to slide in the casing in the longitudinal direction, said sliding member being formed with the same number of engagement holes as that of the permanent magnet pins which are normally projected through said engagement holes with the aid of resilient force of springs, and a magnetic card to be inserted through the card insert hole by a client, said magnetic card having a plurality of magnetized points of which position is determined so that they are located in alignment with the permanent magnet pins when the magnetic card is inserted and of which polarity is same to that of the corresponding, permanent magnet pin, whereby by inserting the magnetic card into the casing the permanent magent pins are caused to come in disengagement from the engagement holes on the sliding member and the latter is ready to slide away from the window to open a client lock allocated to him.

Polarities and coordinate positions of the magnetized points on the magnetic card are previously determined by means of an encoder which is usually disposed in the client reception department of the bank. Since the magnetic card serves also as an identification card for the rental safe room, the encoder is adapted to detect whether a magnetic card specifically allocated to a client is correctly coded or not.

The magnetic card is not designed in the form of a conventional cash card having a tape-shaped magnetizable area but it is prepared by coating a card plate with magnetizable material over the whole area of the card plate.

Further, there is proposed according to another aspect of the present invention a locking and unlocking device particularly employable for a double lock system comprising a bank lock and a client lock in the rental safe room in a bank, wherein the locking and unlocking device includes a base member fixedly secured to the front wall of a rental safe mass, a cover slidably fitted to said base member so as to slide in the longitudinal direction, said cover being provided with first and second raised portions on the inner wall surface, a pair of card holding plates adapted to receive a magnetic card therebetween which is inserted through a card insert hole on the side face of the cover, a plurality of permanent magnet pins slidably fitted through one of said card holding plates at a right angle relative to the latter, a first member in the form of a sliding lever adapted to slide in the cover in the longitudinal direction, said first member being formed with the same number of engagement holes at that of the permanent magnet pins which are normally projected into said engagement holes with the aid of resilient force of springs, a second member in the form of a turning lever turnably supported on a shaft extending between two support members fixedly secured to the base member and a magnetic card to be inserted through the card insert hole by a client, said magnetic card having a plurality of magnetized points of which position is determined so that they are located in alignment with the permanent magnet pins when the magnetic card is inserted and of which polarity is opposite to that of the corresponding permanent magnet pin, whereby unlocking is effected by way of the steps of inserting the magnetic card into the cover to cause the permanent magnet pins to disengage from the engagement holes on the first member, pushing the magnetic card forward further to slide the first member until the second member is disengaged from the second raised portion on the cover and sliding the cover in such a direction that a window on the base member becomes exposed to the outside while the second member slides on the inclined upper face of the second raised portion toward the first raised portion at which it abuts against the latter so that the client can insert his key through the window to open a client lock allocated to him.

Typically, the sliding lever constituting the first member is designed in a substantially U-shaped configuration of which outer plate has an inclined face at its free end part and the turning lever constituting the second member has an inclined face at its free end part so that both the inclined faces of the sliding and turning levers come in contact with one another as the sliding lever is caused to slide with the magnetic card pushed forward further.

Furthermore, there is proposed according to another aspect of the present invention a locking and unlocking device particularly employable for automatic door of a rental safe room including a number of rental safe masses with a double lock system comprising a bank lock and a client lock fitted thereto, wherein the locking and unlocking device comprises a safe room entering reader disposed outwardly of the automatic door to control entering of a client, a safe room leaving reader disposed inwardly of the automatic door to control leaving of the client and a magnetic card to be inserted into either said safe room entering reader or said safe room leaving reader by said magnetic card having a plurality of magnetized points of which position and polarity are determined by means of an encoder, so that a room opening signal is issued from the safe room entering reader with the magnetic card inserted thereinto to an actuating system for opening the automatic door for a predetermined period of time when it is discriminated by means of the safe room entering reader that a client who wants to enter the rental safe room with his rental mass included therein carries a correctly coded magnetic card and after completion of his transaction in his rental safe mass a door opening signal is issued from the safe room leaving reader with his magnetic card inserted thereinto to the actuating system for opening the automatic door for a predetermined period of time when it is discriminated by means of the safe room leaving reader that the client who wants to leave the rental safe room carries a correctly coded magnetic card.

To recover a client's magnetic card it is preferable that the safe room leaving reader includes a card recovering means adapted to receive and store a certain number of magnetic cards therein which are inserted by all clients. When it is found that several magnetic cards are stored in the card recovering means a bank personnel recovers them from the latter so that they are put in reuse.

Other objects, advantages and features of the present invention will become more clearly apparent from reading of the following specification which has been prepared in conjunction of the accompanying drawings.

BRIEF DESCRIPTION OF THE DRAWINGS

The accompanying drawings will be briefly described below.

DETAILED DESCRIPTION OF THE PREFERRED EMBODIMENT

Now, the present invention will be described in a greater detail with reference to the accompanying drawings which illustrate preferred embodiments of the invention.

Figure 1:
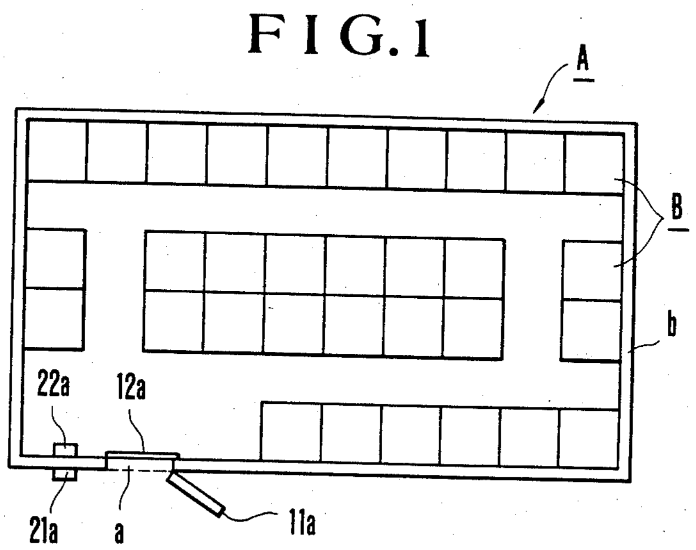
FIG. 1 is a plan view schematically illustrating an example of a rental safe room.

FIG. 1 is a plan view of an example of rental safe room to which the present invention is preferably applicable. As is apparent from the drawing, the rental safe room as identified with reference letter A is a closed chamber of which four side walls are covered with wall plates b exclusive of a single inlet and outlet passage a and a number of rental safe masses B are arranged along the wall plates b in the form of a piled structure as will be best seen from FIG. 2. The inlet and outlet passage a includes two doors comprising a fireproof door 11*a* and an automatic door 12*a* each of which is openably fitted to the inlet and outlet passage a. While the bank is operating its business, the fireproof door 11*a* is kept opened but the automatic door 12*a* is normally closed. The automatic door 12*a* is kept opened for a predetermined period of time only when a signal is issued from a safe room entering reader 21*a* disposed outwardly of the wall plate b or a safe room leaving reader 22*a* disposed inwardly of the wall plate b so as to open it.

Figure 2:
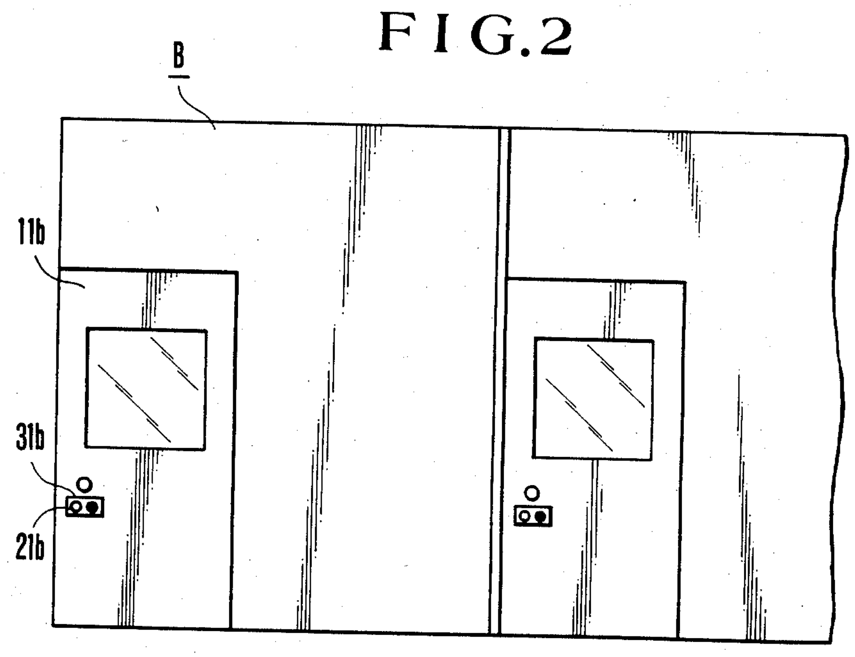
FIG. 2 is a fragmental front view of a number of rental safe masses arranged along the wall surface of the safe room in the piled structure.

FIG. 2 is a fragmental front view of a rental safe room including a number of rental safe masses to each of which a locking and unlocking device of the present invention is attached. Each of the rental safe masses B is allocated to a certain client in accordance with a specific contract made between the bank and the client. As illustrated in the drawing, the rental safe masses B are arranged along the wall surface in the form of a piled structure with their front surfaces being fitted with a door plate 11*b*. The door plate 11*b* has a client lock adapted to be operated only by a client, said client lock being fitted thereto at the position located at the lefthand end part on the rear surface as seen in the drawing. The client lock is formed with a key hole 21*b* which extends through the door plate 11*b*. Moreover, a bank lock 31*b* is fitted to the front surface of the lock door 11*b* in such a manner that a sliding member to be described later normally closes the key hole 21*b*. The latter is caused to open only when the bank lock 31*b* is unlocked.

Next, description will be made below as to the bank lock of the invention particularly with reference to FIGS. 3 to 5.

Figure 3:
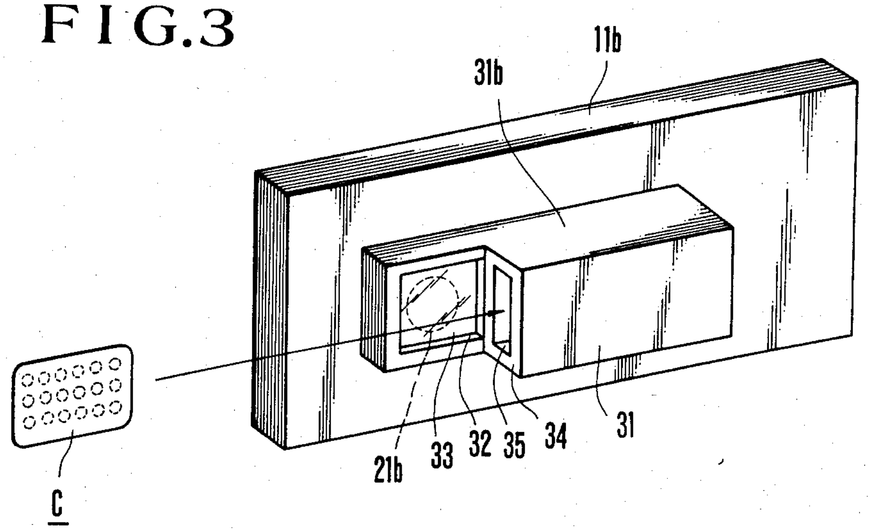
FIG. 3 is a perspective view of a bank lock in accordance with the first embodiment of the invention.
Figure 4:
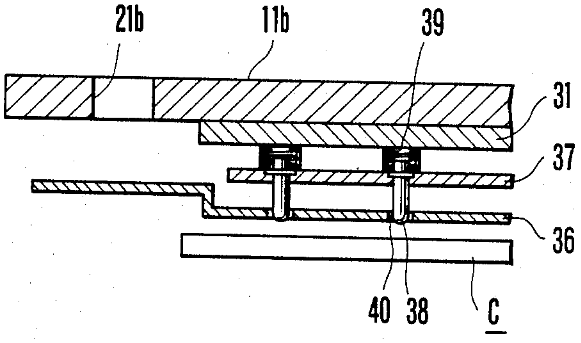
FIG. 4 is a fragmental sectional plan view of the bank lock in FIG. 3.
Figure 5:
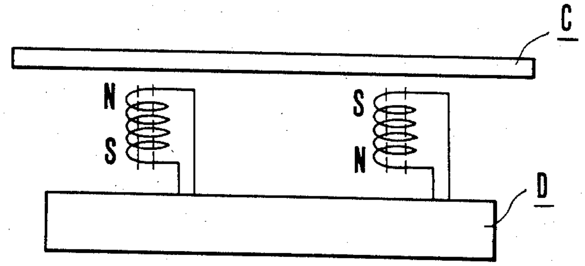
FIG. 5 is a schematic illustration of an encoder employable for the bank lock.

FIGS. 3 to 5 schematically illustrate a bank lock in accordance with the first embodiment of the invention, wherein FIG. 3 is a perspective view of the same. As illustrated in the drawings, a casing 31 constituting a bank lock 31*b* as a main component is fixedly secured to the front surface of the door plate 11*b* for a rental safe mass. The lock casing 31 is designed in the form of an elongated hollow structure constituted by bent metallic plate and it has a thin thickness stepped portion 32 at its lefthand end part as seen in the drawing so as to cover the key hole 21*b*. The stepped portion 32 is formed with a window 33 on the front surface thereof. The window 33 is normally closed with a sliding member to be described later and the key hole 21*b* becomes exposed to the outside when the window 33 is opened so that unlocking is effected for the client lock. The lock casing 31 includes a heavy thickness portion 34 adjacent to the stepped portion 32, said heavy thickness portion 34 having a side face formed with an insert hole 35 through which a magnetic card C serving as locking and unlocking means is inserted.

The magnetic card C has the substantially same rectangular configuration as the conventional identification card which is constructed in the laminated structure using magnetizable material and it is dimensioned corresponding to the bank lock 31*b*. Usually, barium ferrite is employed as magnetizable material and it is coated over the substantially whole area of sheet surface of the magnetic card, but not on the partial area of tape surface as is the case with a conventional cash card. Since barium ferrite plate has advantageous features such as magnetic density higher than conventional magnetic tape or the like, excellently high separability, easy polarization and others, it can be easily magnetized to north polarity or south polarity at any required position located thereon with the aid of an encoder D as schematically illustrated in FIG. 5. It should be noted that it has excellent physical properties in magnetic power and residual magnetism.

FIG. 4 illustrates an example by way of fragmental sectional view of a back lock which is adapted to be unlocked by means of a magnetic card of the above-mentioned kind. As shown in the drawing, the door plate 11*b* has a key hole 21*b* formed at the lefthand end part on the front surface thereof for the client lock and the bank lock 31*b* is fixedly secured to the front surface of the door plate 11*b* in such a manner that the key hole 21*b* is normally closed with a sliding member 36. The latter is designed in the stepped cross-sectional configuration corresponding to the stepped portion of the casing 31, and has a width equal to the inside dimension of the casing 31 so that it is displaced in parallel to the wall surface of the door plate 11*b* in the longitudinal direction while it is fitted through the casing 31. The sliding member 36 is dimensioned such that it has the length as measured from the bent portion toward the window 33 which is long enough to close the latter when the sliding member 36 is displaced in the direction of closing of the window 33 while it has the length as measured from the bent portion toward the heavy thickness portion of the casing which is long enough to freely move within the casing 33 when the sliding member 36 is displaced in the direction of opening of the window 33. Further, the casing 31 includes a plate-shaped fixing member 37 extending in parallel to the heavy thickness portion, said fixing member 37 being fixedly secured to the inner wall of the casing 31, and a plurality of permanent magnet pins 38 displaceably fitted through the fixing member 37 at a right angle relative to the casing 31. The one end part of the permanent magnet pins 38 is resiliently supported by means of a coil spring 39 disposed in the vicinity of the door plate 11*b*, whereas the other end part of the same is extended toward the sliding member 36 under the influence of fine resilient force given by the spring 39. The sliding member 36 is formed with a plurality of engagement holes 40 adapted to receive the free end part of the permanent magnet pins 38 to lock movement of the sliding member 36, said engagement holes 40 being located at the positions corresponding to those assumed by the permanent magnet pins 38 when the sliding member 36 reaches the position where the window 33 is fully closed. It should be noted that the positions of both north and south poles of the permanent magnet pins 38 are different for each of the rental safe masses.

When the magnetic card C is inserted through the insert hole 35 to the predetermined position where the magnetized points on the magnetic card C are located in correct alignment with the permanent magnetic pins 38 in such a manner that the one magnet pin 38 has north pole at the card side and the magnetic card C has also north pole at the same position while the other magnet pin 38 has south pole at the card side and the magnetic card C has also south pole at the same position, the permanent magnet pins 38 are pushed away from the magnetic card C toward the door plate against the fine resilient force of the springs 39. Thus, magnet pins 38 are disengaged from the engagement holes 40 of the sliding member 36. As a result the sliding member 36 becomes ready to move away from the position where the window 33 is closed. Thus, the bank lock 31*b* is kept opened so that the client lock can be unlocked while the window 33 is opened. When the magnetic card C is inserted to the position where the magnetized points predetermined thereon by means of the encoder are incorrectly located in alignment with the permanent magnet pins 38 with respect to position and polarity for any reason, or a client operates a rental safe mass owned by other client by mistake, the permanent magnet pins 38 are kept in engagement to the sliding member 36. Therefore the bank lock 31*b* is still not unlocked.

Figure 6:
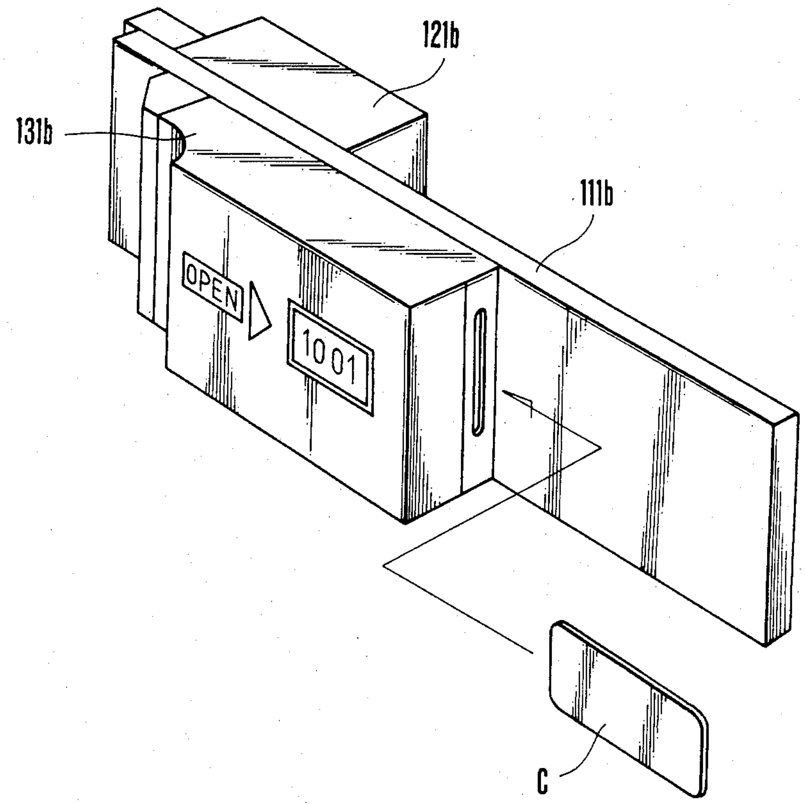
FIG. 6 is a perspective view of a bank lock in accordance with the second embodiment of the invention.

Next, description will be made as to a bank lock in accordance with the second embodiment of the invention with reference to FIGS. 6 to 12, wherein FIG. 6 is a perspective view of the bank lock. As is apparent from the drawings, each of rental safe masses includes a door plate 111*b* to which a door lock 121*b* serving as client lock and an outer lock 131*b* serving as bank lock are fixedly secured. The outer lock 131*b* has an elongated cover with which a key hole for the door lock 121*b* and a base member for the outer lock 131*b* are covered. The cover is fitted to the base member so as to slide in the longitudinal direction and it is designed so that the key hole becomes exposed to the outside when it is slidably displaced away from the window. In the illustrated embodiment the cover is formed with an insert hole for a magnetic card C on the side wall located remote from the key hole but it should be noted that the present invention should not be limited only to this. Alternatively, the position where the card insert hole is disposed may be suitably determined in dependence on arrangement of rental safe masses or structure of door plate and door lock.

The magnetic card C is identical to that in the first embodiment which is made of barium ferrite.

Figure 7:
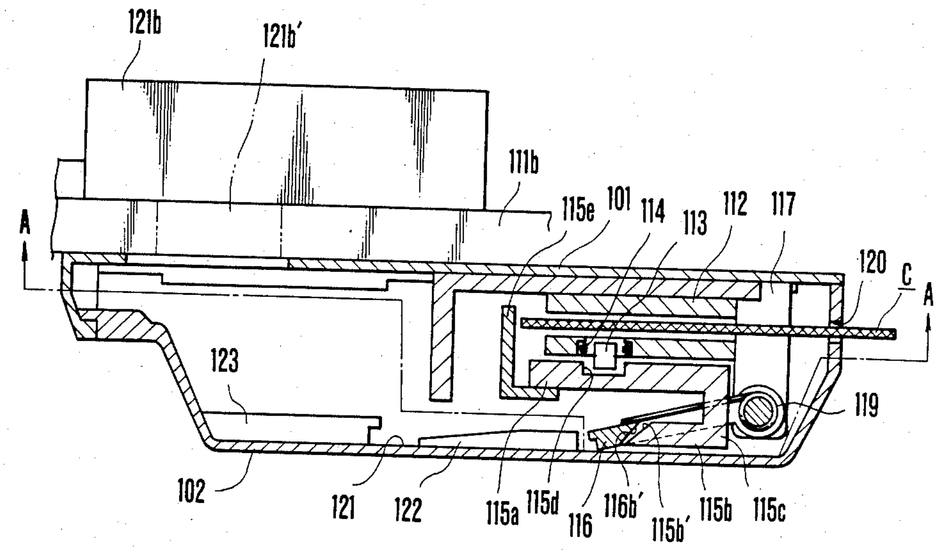
FIG. 7 is a sectional plan view of the bank lock in FIG. 6.
Figure 8:
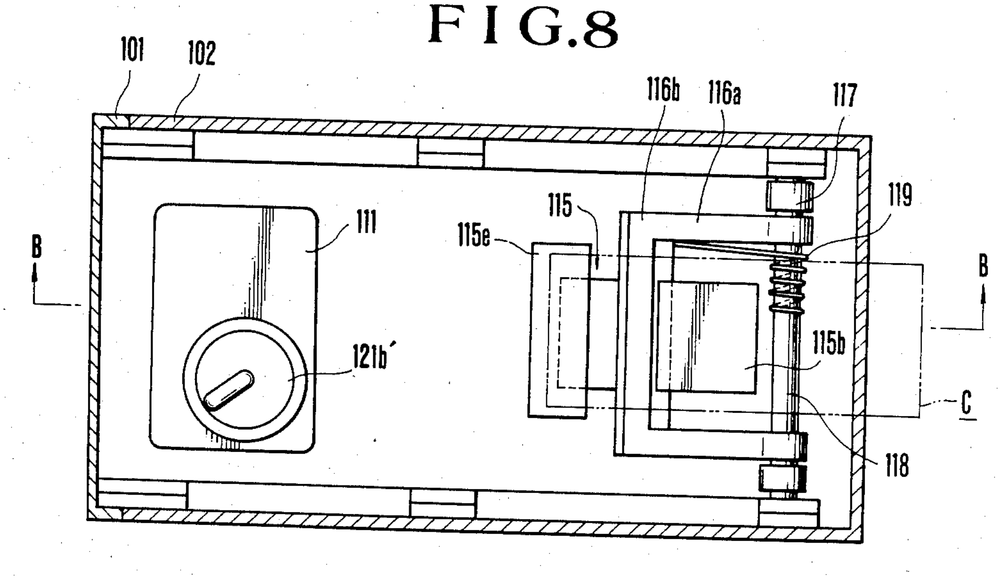
FIG. 8 is a sectional front view of the bank lock in FIG. 6.

FIGS. 7 and 8 are a sectional view of the bank lock in accordance with the second embodiment of the invention respectively, wherein the magnetic card C is kept inserted into the bank lock. Referring to the drawings, the outer lock serving as bank lock is constructed by a combination of a base member 101 and a cover 102 slidably fitted to said base member 101. The latter constituting the outer lock has an elongated rectangular configuration on the wall surface of the door plate with a key hole 121*b* formed thereon and it is formed with a window 111 which is dimensioned wide enough to allow the key hole 121*b* to be exposed to the outside. Further, the base member 101 includes a pair of card holding plates 112 which are fixedly disposed in parallel to the wall surface of the door plate so as to hold a magnetic card C therebetween and a plurality of permanent magnet pins 113 are slidably fitted through one of the card holding plates 112 at a right angle relative to the latter. A combination of north and south polarities of the permanent magnet pins 113 and their coordinate positions on the wall surface of the holding plate represents an identification code specific to each of rental safe masses and therefore the card holding plates 112 and the permanent magnet pins 113 constitutes an identification means for the magnetic card to be inserted between the card holding plates 112. The permanent magnet pins 113 are displaceably supported on one of the card holding plates 112 with springs 114 fitted into holes formed thereon, whereas they are brought in fine resilient contact with a first member 115 under the influence of the springs 114. The first member 115 comprises an inner plate 115*a* adapted to come in contact with one of the card holding plates 112, an outer plate 115*b* adapted to come in contact with the cover 102, said outer plate 115*b* extending in parallel to said inner plate 115*a*, and a connecting plate 115*c* for integrally connecting both the inner and outer plates 115*a* and 115*b* to one another at their right-hand end part so that it serves as a sliding lever which has a substantially U-shaped cross-sectional configuration. The inner plate 115*a* is formed with a plurality of engagement holes 115*d* at the coordinate positions located corresponding to those of the permanent magnet pins 113. When the sliding lever 115 reaches a predetermined engagement position, the permanent magnet pins 113 come in engagement to the engagement holes 115*d* at their one end so that movement of the sliding lever is locked. When the magnetic card C is inserted through the insert hole into the space as defined by the card holding plates 112 and an identification means comprising polarities of the magnetized points on the magnetic card and their coordinate positions assumed thereon corresponds to a specific identification code allocated to the rental safe mass, said identification means being prepared by means of an encoded which is disposed in the client reception department in a bank, the permanent magnet pins 113 are caused to come in disengagement from the engagement holes 115*d* under the influence of magnetic force developed by barium ferrite whereby the sliding lever 115 is unlocked. Once the sliding lever 115, that is, the first member has been unlocked, it is ready to move from the locked position to the unlocked position.

A pair of support members 117 are projected horizontally from the base member 101 and a shaft 118 stands upright between the free end parts of the support members 117 so that a turning lever 116 is disposed on said shaft 118 so as to turn about the latter. The turning lever 116, that is, the second member comprises a pair of arms 116*a* of which free end part is turnably mounted on the shaft 118 and an engagement plate 116*b* bridged between said arms 116*a* to integrally connect them to one another and it is normally urged by means of a spring 119 on the shaft to turn in such a direction that the engagement plate 116*b* is brought in contact with the cover 102. The engagement plate 116*b* has an inclined portion 116*b*' which is adapted to come in contact with the inclined portion 115*b*' of the outer plate 115*b* constituting the sliding lever 115 and as the latter is displaced from the locked position to the unlocked position, the turning lever 116 is caused to turn against resilient force of the spring 119 in the direction of displacement away from the cover 102.

The cover 102 is made of metallic plate by bending the latter to an elongated box-shaped configuration and has such dimensions as to cover the whole base member. Specifically, the cover 102 is fitted to the base member 101 in such a manner that its opened bottom is closed with the wall surface of the door plate and it is free to slide in the longitudinal direction. The card insert hole 120 having an elongated rectangular configuration is formed on the righthand side wall of the cover 102 as seen in the drawings so as to insert the magnetic card C therethrough. The cover 102 has a top wall 121 located opposite to the door plate and two raised portions 122 and 123 are projected inwardly of said top wall 121 so that the engagement plate **116*b* of the turning lever 116 comes in engagement to said raised portion 122 or 123 to inhibit sliding movement of the cover 102 when the latter is located at the position where the key hole on the door lock is closed or at the position where the same is opened. While the cover 102 is brought in engagement to the turning lever 116 in the above-mentioned closed position, the bank lock is kept in the locked state and when the turning lever 116 is caused to turn away from the engagement position and the cover 102** is displaced to the position where the key hole is opened, the bank lock is ready to be unlocked.

Next, description will be made as to unlocking operation of the locking and unlocking device in accordance with the second embodiment as described above.

A client who carries a magnetic card C specifically magnetized for him by the client reception department in the bank enters the rental safe room in which he has his rental safe mass allocated to him in accordance with a contract made between the bank and the client. Then, he inserts the magnetic card C through the card insert hole 120 which is provided on the outer lock, as illustrated in FIGS. 7 and 8. In this operational state the turning lever 116 comes in contact with the cover 102 in such a manner that it abuts against the raised portion 122 and therefore the cover 102 cannot move any more.

Figure 9:
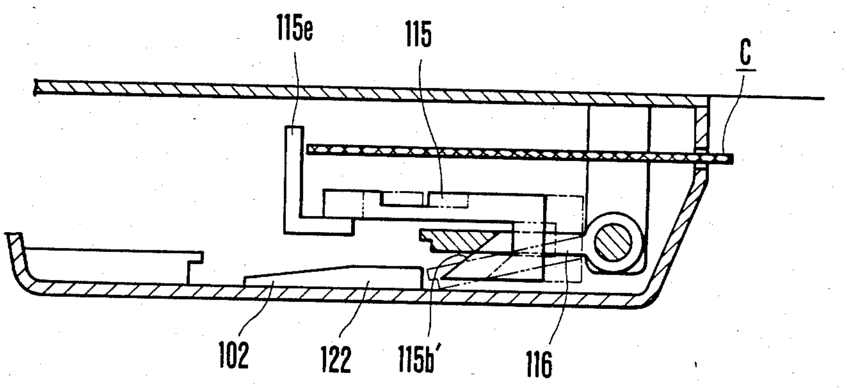
FIG. 9 is a sectional plan view of the bank lock in FIG. 6, illustrating that unlocking operation is carried out for the bank lock.

When identification means comprising a combination of polarities of magnetized points on the magnetic card C and their coordinate position located thereon corresponds an identification code previously determined for the rental safe mass, the permanent magnet pins 113 is caused to come in disengagement from the engagement holes **115*d* under the influence of magnetic force and thereby the sliding lever 115 is released from the locked state. Next, by pushing the magnetic card C forward further, the sliding lever 115 is displaced to the unlocked position by means of the actuating plate 115*e* adapted to be actuated by the magnetic card C. FIG. 9 is a sectional view of the bank lock which has assumed the unlocked position as described above. As is apparent from the drawing, the sliding lever 116 is kept in the unlocked state and the turning lever 116 is brought in disengagement from the raised portion 122 on the cover 102 while the turning lever 116 is displaced upwardly due to thrusting contact of the inclined face 115*b*' of the outer plate of the sliding lever 115 with the inclined face 116*b*' of the turning lever 116**.

Figure 10:
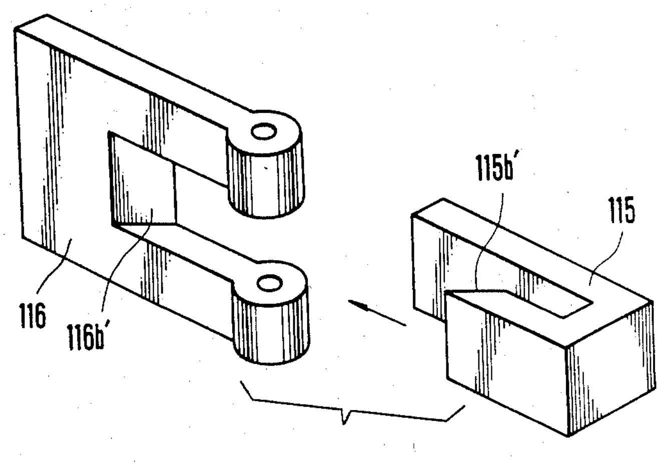
FIG. 10 is a perspective view of essential components comprising a sliding lever and a turning lever, shown in the separated state.
Figure 11:
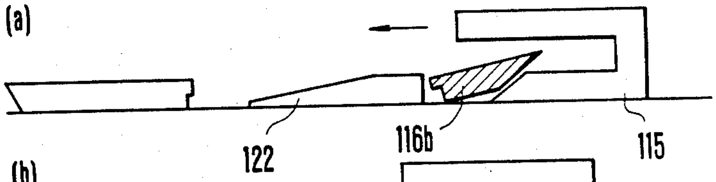
FIGS. 11(*a*) to (*d*) are a fragmental sectional plan view of the bank lock in FIG. 6 respectively, particularly illustrating how the sliding lever and the turning lever are operated, wherein FIG. 11(*a*) illustrates that the sliding lever is displaced in the leftward direction while the turning lever comes in engagement to the righthand raised portion, FIG. 11(*b*) illustrates that the turning lever is turned up to the position where it is located above the righthand raised portion and it comes in disengagement from the latter, FIG. 11(*c*) illustrates that the cover is displaced in the rightward direction and therefore the turning lever slides down along the inclined surface of the righthand raised portion while the sliding lever resumes the original position, and FIG. 11(*d*) illustrates that the turning lever comes in engagement to the lefthand raised portion while the sliding lever is held at the original position.
Figure 11:
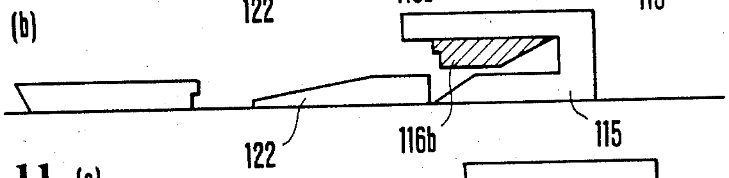
Figure 11:
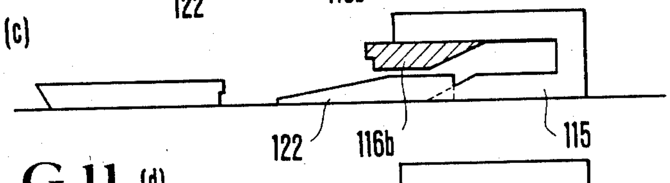
Figure 11:
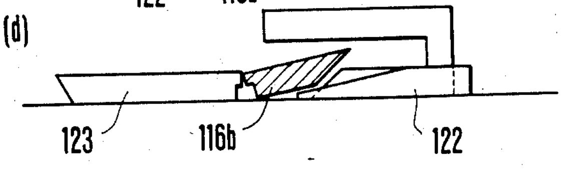

Operations of two levers will be described in more details below with reference to FIGS. 10 and 11, wherein FIG. 10 is a perspective view illustrating an example of both the first and second members. The first member 115, that is, the sliding lever has an inclined face **115*b*' on its outer plate and the second member 116, that is, the turning lever has an inclined face 116*b*' so that both the inclined faces 115*b*' and 116*b*' come in sliding contact with one another. On the other hand, FIGS. 11**(*a*) to (*d*) are a cross-sectional view of both the sliding and turning levers respectively which illustrates a displacement relation among the sliding lever, the turning lever and the cover. Specifically, FIG. 11(*a*) illustrates the above-mentioned locked state where the engagement plate **116*b* constituting the turning lever 116 comes in engagement to the raised portion 122. As the sliding lever 115 is displaced from the foregoing locked state in the direction as identified with an arrow mark, the turning lever 116 is caused to turn upwardly due to sliding contact of the one inclined face with the other one as mentioned above, whereby the engagement plate 116*b* of the turning lever 116 is parted away from the raised portion 122. FIG. 11**(*b*) illustrates the foregoing disengaged state where the sliding lever 115 is ready to move toward the unlocked position. Next, the client tends to draw the cover 102 in the direction of displacement away from the key hole with the aid of his one hand, while he continues to push the magnetic card C with light force imparted to the latter by his other hand. Since the cover has been already released from the engaged state, it initiates its sliding movement. FIG. 11 (*c*) illustrates the operational position which each of the members constituting the bank lock assumes after starting of sliding movement. Since the engagement plate **111*b*' is brought in sliding contact with the raised portion 122, the cover 102 continues to slide irrespective of the fact that the client's hand is parted away from the magnetic card C and thereby the sliding lever 115 resumes the engaged position. The raised portion 122 has an inclined face at the lefthand part thereof as seen in the drawing which extends downward at a certain inclination angle and therefore as the cover 102 is displaced in the rightward direction, the engagement plate 116*b* is caused to turn in the anticlockwise direction under the influence of resilient force of the spring 119 until it comes in engagement to the other raised portion 123. FIG. 11**(*d*) illustrates the final position where the bank lock is fully unlocked. At this moment the cover 102 assumes the position where the key hole on the door lock is exposed to the outside. Now, the client is ready to open his rental safe mass by operating his own key and then take out or deposit his articles.

Figure 12:
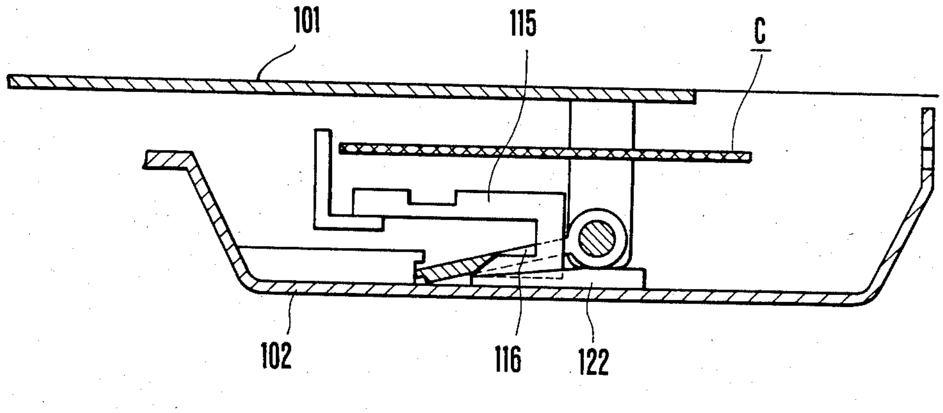
FIG. 12 is a sectional plan view of the bank lock in FIG. 6, illustrating that the bank lock is unlocked.

FIG. 12 is a sectional view of the bank lock of the invention which is kept in the unlocked state, corresponding to the fragmental sectional view as represented by FIG. 11 (*d*). As will be apparent from the drawing, a characterizing feature of the bank lock is that the magnetic card C is completely included within the interior of the cover 102 and therefore any client cannot grasp it unless the original locked position is restored for the outer lock again. Owing to this it is unavoidably confirmed that the outer lock is kept locked when he has to leave the rental safe room with his magnetic card carried by him or when his magnetic card has to be returned to the bank. As a result it is assured that all bank keys are safely controlled without any burden imparted to the bank. Thus, this characterizing feature will be very useful and valuable from the viewpoint of protection against occurrence of criminal activities.

When locking is to be effected, all that is to be done is merely to displace the cover 102 in the opposite direction to that of unlocking operation with the client's hand. When the engagement plate 116*b* of the turning lever 116 moves up along the inclined surface of the raised portion 122 and runs over it while the cover 102 assumes the closed position, the turning lever 116 is caused to turn in the anticlockwise direction under the influence of resilient force of the spring 119 until it comes in engagement to the raised portion 122. As a result the sliding lever 115 resumes the original engaged position. When the client draws the magnetic card C out of the card insert hole 120, the permanent magnet pins 113 enter the engagement holes 115*d* to lock the sliding lever 115 so that locking is effected perfectly.

As will be readily understood, the position where the door lock is attached to the door plate varies in dependence on the position where a rental safe mass is disposed in the rental safe room. While the present invention has been described above merely with respect to preferred embodiments, it should of course be understood that it should not be limited only to them. Alternatively, any arrangement may be suitably made in various manners such that members and components constituting the locking and unlocking device of the invention are disposed in the point, line or face symmetrical relation. However, it should be noted that any change or modification made in the above-mentioned manner is involved within the scope of the invention as defined in claims.

It should be repeatedly mentioned that when the locking and unlocking device of the invention is to be attached to the door plate, the bank lock constituting one of a double lock system as a rental safe lock should be held in the unlocked state.

Next, description will be made below as to a locking and unlocking device with reference to FIGS. 13 and 14, said locking and unlocking device being employable for a rental safe room in which a number of rental safe masses are arranged along the wall surface in a rental safe room in the piled structure.

Figure 13:
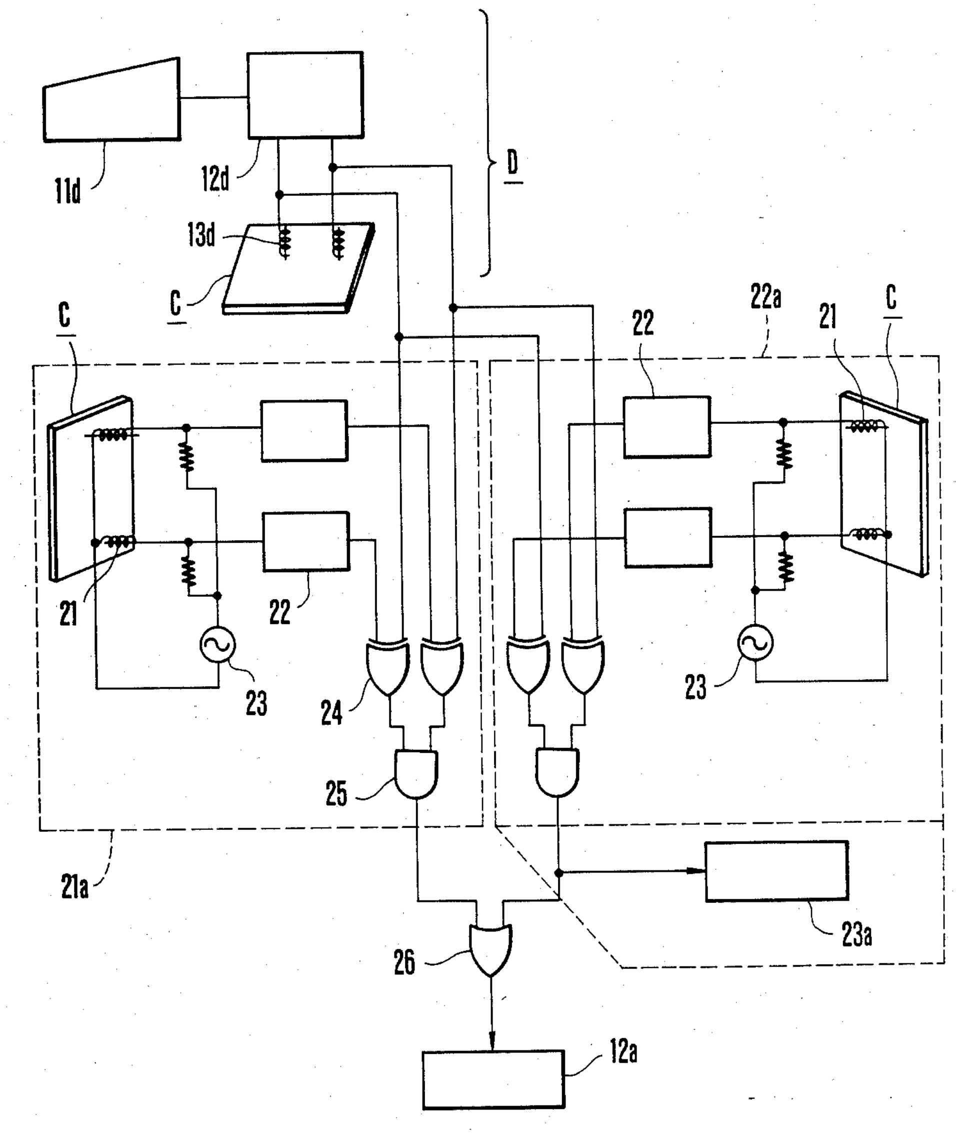
FIG. 13 is a block diagram schematically illustrating a locking and unlocking device in accordance with the third embodiment of the invention which is employed for an automatic door of the rental safe room.
Figure 14:
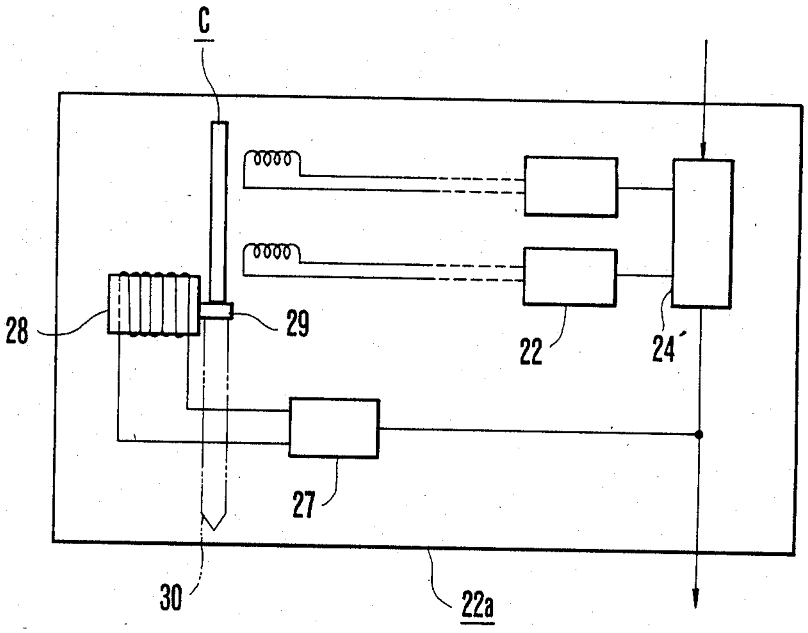
FIG. 14 is a schematic illustration of a card recovering means for the locking and unlocking device in FIG. 13.

FIG. 13 is a block diagram which schematically illustrates an example of locking and unlocking device for operating an automatic door for the rental safe room to which the present invention is applied. As illustrated in the drawings, the locking and unlocking device includes an encoder D, an automatic door 12*a*, a safe room entering reader 21*a*, a safe room leaving reader 22*a* and a magnetic card recovering means 23*a*. Specifically, the encoder D is disposed in the client reception department in a bank in which a personnel in charge of managing and controlling of the rental safe room stays at all times and it includes a key board 11*d*, a memory 12*d* and a plurality of encoder solenoids 13*d*. When a client asks the personnel to let him use his rental safe mass which has been allocated to him in accordance with a contract made between the client and the bank, the personnel picks up a magnetic card C for him and sets it on the encoder solenoids 13*d* so that his contract number is inputted into the magnetic card C by operating the key board 11*d*. The memory 12*d* into which a contract number allocated to the client has been inputted with the aid of the key board 11*d* serves as an address to read informations on magnetic characteristics relative to position and polarity of the permanent magent pins included in the bank lock which is attached to his rental safe mass. The magnetic card C is then magnetized by means of the encoder solenoids 13*d* in accordance with the above informations on magnetic characteristics and at the same time the informations are transmitted to both the safe room entering reader 21*a* and the safe room leaving reader 22*a* each of which serves as detecting means for his given identification code. The safe room entering reader 21*a* is disposed outwardly of the wall surface of the rental safe room and includes a pair of detecting solenoids 21, a pair of detecting circuits 22 and an oscillator 23. After the client receives his magnetic card C from a bank personnel, he brings it to the rental safe room and then inserts it into the safe room entering reader 21*a*. The detecting solenoids respond to insertion of the magnetic card C and the latter is read out by means of the detecting circuits 22 until magnetic characteristics on the magnetic card C are detected. Then, an exclusive OR gate 24 confirms whether the detected magnetic characteristics are identical to informations on magnetic characteristics transmitted from the memory 12*d* or not. When it is determined by means of an AND gate 25 that the former are identical to the latter with respect to all the permanent magnet pins, a door opening signal is issued. The same steps of detection and identification are carried out for the safe room leaving reader 23*a* and thereafter a door closing signal is issued in the same manner as described above. Once a door opening signal has been transmitted to the automatic door 12*a* by way of the OR gate 26, it is kept opened for a predetermined period of time. Incidentally, transmission of door opening signal should not be limited only to the automatic door. Alternatively, it may be transmitted to the unlocking section in conventional electronic lock fixedly secured to the door. Thus, the locking and unlocking device in accordance with the third embodiment of the invention assures that any room lock for the rental safe room is unlocked by utilizing polarities of magnetized points on a magnetic card and their coordinate positions as an identification code.

After the client draws his magnetic card from the safe room entering reader 22*a*, he enters the rental safe room and stands in front of his rental safe mass to insert the magnetic card into the bank lock. Unlocking of the latter is carried out by way of the above-described steps and then he opens his client lock by operating his key to take out or deposit his articles.

On completion of his transaction he closes the client lock and locks it. Thereafter he takes his magnetic card from the bank lock to lock his rental safe mass. When he leaves the rental safe mass, he inserts his magnetic card into the safe room leaving reader 22*a* and when it is confirmed that informations on magnetic characteristics of the magnetic card C are identical to those transmitted from the memory 12*d*, a door opening signal is issued in the same manner as in case of the safe room entering reader 21*a* so that the automatic door 12*a* of the rental safe room is kept opened for a predetermined period of time. Now, the client is ready to leave.

When he leaves the rental safe room, he is not required to take his magnetic card from the safe room leaving reader 22*a*. As illustrated in FIG. 13, the door opening signal is simultaneously transmitted to the magnetic card recovering means 23*a* so that the magnetic card is delivered to a card storing section in the safe room leaving reader 23*a*. Alternatively, he may return the magnetic card to the personnel in the bank. FIG. 14 is a block diagram schematically illustrating an example of magnetic card recovering means for the safe room leaving reader 22*a*. As illustrated in the drawing, the magnetic card recovering means is disposed in the safe room leaving reader 22*a* and includes an exciting circuit 27, a solenoid 28, a core 29 and a card storing section 30. When the magnetic card C is inserted into the safe room leaving reader 22*a* at the predetermined position, it is held on the projected part of the core 29 at the position located above the card storing section 30. At this moment informations on magnetic characteristics of the magnetic card C are read out by means of the detecting circuit 22 and when it is confirmed with the aid of a discriminating circuit 24' (which corresponds to a combination of the exclusive OR gate 24, the AND gate 25 and the OR gate 26) that the aforesaid informations are identical to those transmitted from the memory **12*d*, a door opening signal is generated and transmitted to the automatic door and at the same time it is transmitted to the exciting circuit 27 in the card recovering means. When electric current flows through the solenoid 28 from the exciting circuit 27 and thereby the core 29 is caused to retract, the magnetic card C falls down because of no existence of holding means and it is stored in the card storing section 30**. When it is found that several magnetic card are stored therein, a personnel in the bank recovers them so that they are put in reuse. Since the locking and unlocking device of the invention is constructed such that a specific identification code is given to each of the magnetic cards every time when it is used, it results that there is necessity for preparing a small number of magnetic cards for the locking and unlocking device with reduced expenditure required therefor.

As a modification from the above-described embodiment the discriminating circuit 24' may be electrically connected to a printer so that client' name (or client's number), safe room entering time, safe room leaving time and others are printed or recorded without any particular difficulty.

Now, advantageous features of the locking and unlocking device in accordance with the invention will be summarized below.

(1) It does not require a power supply.

(2) It can be additionally ued for any kind of existent locking and unlocking device so that a double lock system is easily established. As a result more reliable locking and unlocking are assured.

(3) Magnetic characteristics of magnetized points on a magnetic card serve as key function and moreover they serve also as information control means.

(4) Since a magnetic card can be easily magnetized or remagnetized by means of an encoder, there is no necessity for preparing one magnetic card for every locking and unlocking device. It suffices that it is magnetized only when a client operates the locking and unlocking device. As a result card control is easily carried out.

While the present invention has been described above with respect to a few preferred embodiments, it should of course be understood that it should not be limited only to them but various changes or modifications may be suitably made without any departure from the spirit and scope of the invention as defined by appended claims.

What is claimed is:

1. A locking and unlocking device preferably employable for a double lock system comprising a bank lock and a client lock, characterized in that said locking and unlocking device comprises a casing with a window and a card insert hole formed thereon, a base plate fixedly secured to said casing, a plurality of permanent magnet pins slidably fitted through said base plate at a right angle relative to the latter, a sliding member adapted to slide in the casing in the longitudinal direction, said sliding member being formed with the same number of engagement holes as that of the permanent magnet pins which are normally projected through said engagement holes with the aid of resilient force of springs, and a magnetic card to be inserted through the card insert hole by a client, said magnetic card having a plurality of magnetized points of which position is determined so that they are located in alignment with the permanent magnet pins when the magnetic card is inserted and of which polarity is same to that of the corresponding permanent magnet pin, whereby by inserting the magnetic card into the casing the permanent magnet pins are caused to disengage from the engagement holes on the sliding member and the latter is ready to slide away from the window so that the client can insert his key through the window to open a client lock allocated to him.

2. A locking and unlocking device as defined in claim 1, characterized in that polarities and coordinate positions of the magnetized points on the magnetic card are previously determined by means of an encoder.

3. A locking and unlocking device as defined in claim 1, characterized in that the encoder is capable of detecting whether a magnetic card specifically allocated to the client is correctly coded or not.

4. A locking and unlocking device as defined in claim 1, characterized in that the magnetic card is prepared by coating a card plate with magnetizable material over the whole area of said card plate.

5. A locking and unlocking device as defined in claim 1, characterized in that the casing is designed in a box-shaped configuration and comprises a thin thickness stepped portion and a heavy thickness portion so that the window is formed on the thin thickness stepped portion and the card insert hole is formed on the side face of the heavy thickness portion.

6. A locking and unlocking device preferably employable for a double lock system comprising a bank lock and a client lock, characterized in that said locking and unlocking device comprises a base member fixedly secured to the front wall of a rental safe mass, a cover slidably fitted to said base member so as to slide in the longitudinal direction, said cover being provided with first and second raised portions on the inner wall surface, a pair of card holding plates adapted to receive a magnetic card therebetween which is inserted through a card insert hole on the side face of the cover, a plurality of permanent magnet pins slidably fitted through one of said card holding plates at a right angle relative to the latter, a first member in the form of a sliding lever adapted to slide in the cover in the longitudinal direction, said first member being formed with the same number of engagement holes as that of the permanent magnet pins which are normally projected into said engagement holes with the aid of resilient force of springs, a second member in the form of a turning lever turnably supported on a shaft extending between two support members fixedly secured to the base member and a magnetic card to be inserted through the card insert hole by a client, said magnetic card having a plurality of magnetized points of which position is determined so that they are located in alignment with the permanent magnet pins when the magnetic card is inserted and of which polarity is opposite to that of the corresponding permanent magnet pin, whereby unlocking is effected by way of the steps of inserting the magnetic card into the cover to cause the permanent magnet pins to disengage from the engagement holes on the first member, pushing the magnetic card forward further to slide the first member until the second member is disengaged from the second raised portion on the cover and sliding the cover in such a direction that a window on the base member becomes exposed to the outside while the second member slides on the inclined upper surface of the second raised portion toward the first raised portion at which it abuts against the latter so that the client can insert his key through the window to open a client lock allocated to him.

7. A locking and unlocking device as defined in claim 6, characterized in that polarities and coordinate positions of the magnetized points on the magnetic card are previously determined by means of an encoder.

8. A locking and unlocking device as defined in claim 6, characterized in that the encoder is capable of detecting whether a magnetic card specifically allocated to the client is correctly coded or not.

9. A locking and unlocking device as defined in claim 6, characterized in that the magnetic card is prepared by coating a card plate with magnetizable material over the whole area of said card plate.

10. A locking and unlocking device as defined in claim 6, characterized in that the sliding lever constituting the first member is designed in a substantially U-shaped configuration of which outer plate has an inclined face at its free end part and the turning lever constituting the second member has an inclined face at its free end part so that both the inclined faces of the sliding and turning levers come in contact with one another as the sliding lever is caused to slide with the magnetic card pushed forward further.

11. A locking and unlocking device as defined in claim 6, characterized in that the cover slidably fitted to the base member is designed in a box-shaped configuration with the card insert hole formed on the one side wall and the base member is formed with a window at the one end part thereof through which a client's key is inserted.

12. A locking and unlocking device preferably employable for an automatic door of a rental safe room including a number of rental safe masses with a double lock system comprising a bank lock and a client lock fitted thereto, characterized in that said locking and unlocking device comprises a safe room entering reader disposed outwardly of the automatic door to control entering of a client, a safe room leaving reader disposed inwardly of the automatic door to control leaving of the client and a magnetic card to be inserted into either said safe room entering reader or said safe room leaving reader by him, said magnetic card having a plurality of magnetized points of which position and polarity are determined by means of an encoder, so that a door opening signal is issued from the safe room entering reader with the magnetic card inserted thereinto to an actuating system for opening the automatic door for a predetermined period of time when it is discriminated by means of the safe room entering reader that a client who wants to enter the rental safe room with his rental safe mass included therein carries a correctly coded magnetic card and after completion of his transaction in his rental safe mass a door opening signal is issued from the safe room leaving reader with his magnetic card inserted thereinto to the actuating system for opening the automatic door for a predetermined period of time when it is discriminated by means of the safe room leaving reader that the client who wants to leave the rental safe room carried a correctly coded magnetic card.

13. A locking and unlocking device as defined in claim 12, characterized in that the magnetic card specifically allocated to the client is usable for operating the bank lock fitted to the rental safe mass.

14. A locking and unlocking device as defined in claim 12, characterized in that polarities and coordinate positions on the magnetized points on the magnetic card are previously determined by means of an encoder.

15. A locking and unlocking device as defined in claim 12, characterized in that the encoder is capable of detecting whether a magnetic card specifically allocated to the client is correctly coded or not.

16. A locking and unlocking device as defined in claim 12, characterized in that the magnetic card is prepared by coating a card plate with magnetizable material over the whole area of said card plate.

17. A locking and unlocking device as defined in claim 12, characterized in that the safe room leaving reader includes a card recovering means adapted to receive and store a certain number of magnetic cards therein which are inserted by all clients.

* * * * *